(No Model.) 2 Sheets—Sheet 1.

C. H. TOWNSEND.
DOUBLE REFLECTING CIRCLE.

No. 377,280. Patented Jan. 31, 1888.

Witnesses:
J. H. Shumway
Fred C. Earle

Chas. H. Townsend
Inventor
By atty.
John C. Earle (No Model.) 2 Sheets—Sheet 2.

C. H. TOWNSEND.
DOUBLE REFLECTING CIRCLE.

No. 377,280. Patented Jan. 31, 1888.

United States Patent Office.

CHARLES H. TOWNSEND, OF NEW HAVEN, CONNECTICUT.

DOUBLE REFLECTING-CIRCLE.

SPECIFICATION forming part of Letters Patent No. 377,280, dated January 31, 1888.

Application filed June 20, 1887. Serial No. 241,937. (No model.)

*To all whom it may concern:*

Be it known that I, CHARLES H. TOWNSEND, of New Haven, in the county of New Haven and State of Connecticut, have invented a new Improvement in Double Reflecting-Circles; and I do hereby declare the following, when taken in connection with accompanying drawings and the letters of reference marked thereon, to be a full, clear, and exact description of the same, and which said drawings constitute part of this specification, and represent, in—

Figure 1:
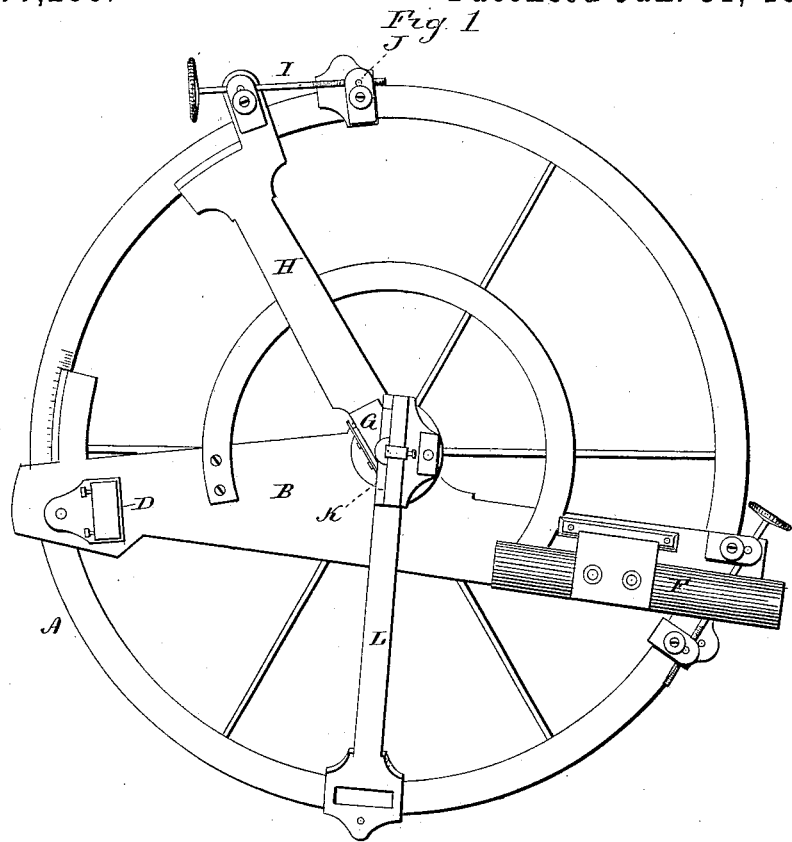
Figure 2:
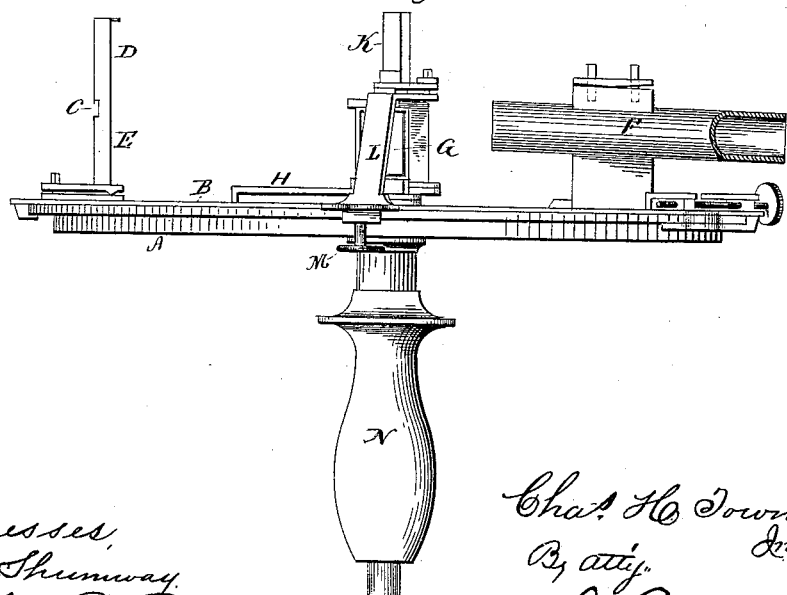
Figure 3:
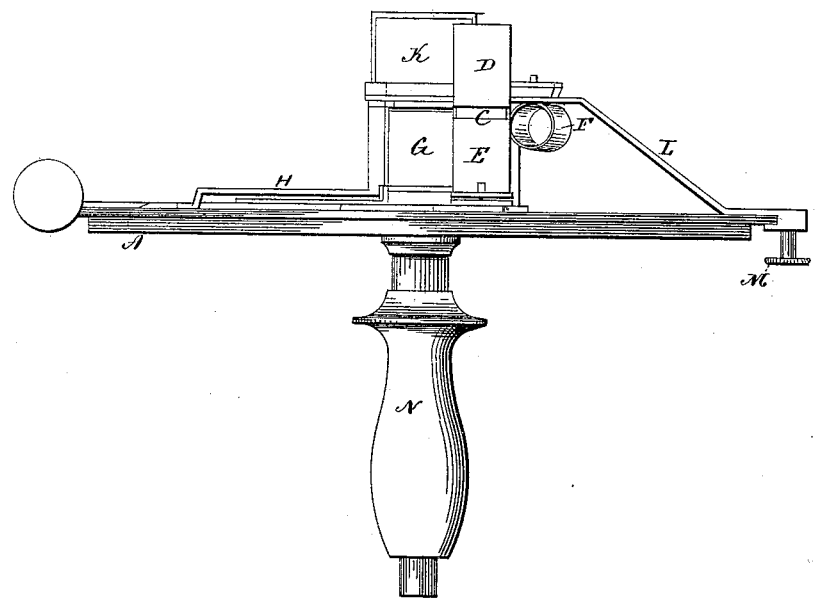
Figure 4:
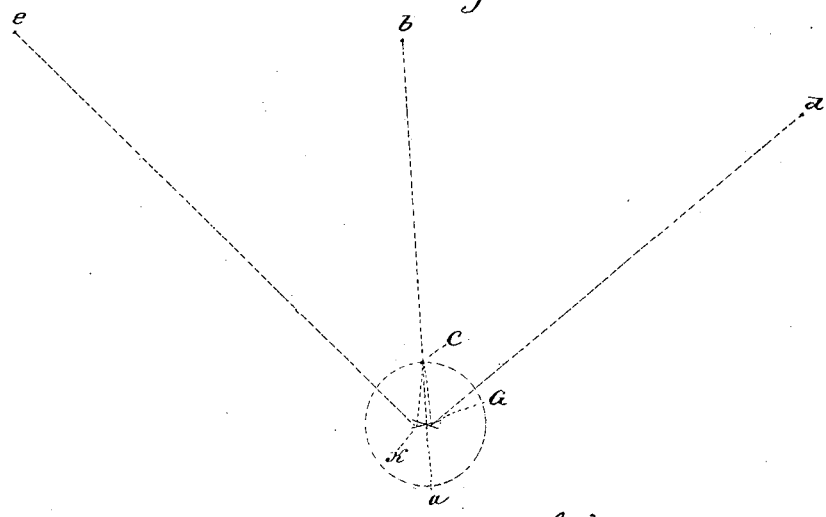

Figure 1, a top or plan view of the instrument; Fig. 2, a side view of the same; Fig. 3, a side view turned one-fourth around from the position in Fig. 2; Fig. 4, a diagram illustrating the use of the instrument.

This invention relates to an improvement in reflecting-circles whereby a certain point is ascertained by its angular relation to certain distant points, the object of the invention being the construction of a single instrument whereby several distant points may be observed with relation to the one point where the instrument is located, either for the purpose of, by the use of a single instrument, determining the angles of several distant points with relation to a single point for the purpose of locating that single point where the instrument may be in use, or for discovering a particular point by its known angles with relation to several distant points.

Instruments for ascertaining the location of a certain point with relation to distant objects by angles taken from the located point are common and well known; but several observations are necessary to be made to ascertain the angles with relation to the several points, and to do this several instruments are necessary.

By my invention I accomplish the location of a point with relation to several distant points in a single instrument, and so that by a single observation the relative position of the several points is determined; and the invention consists in a graduated circle having two or more reflectors hung upon an axis concentric with the said circle, the plane of the reflectors being substantially parallel with the axis of the circle, combined with a horizon-sight and two or more reflectors in the same vertical line with the horizon-sight, and corresponding to the said concentrically-hung reflectors, the said concentrically-hung reflectors made adjustable about their axis, and whereby two or more distant objects, and at different points, may be brought into line with the horizon-sight by the reflectors, which themselves are in line with the horizon-sight, and as more fully hereinafter described.

A represents the ring or circle, which is graduated to indicate degrees in the usual manner for graduating reflecting-circles. Concentrically on this circle a turn-table, B, is arranged, adapted to be adjusted in a plane parallel with the plane of the circle and around the axis of the circle. This turn-table carries near one extreme the horizon-sight C. This sight is formed centrally in an upright made fast to the turn-table. Above the horizon-sight is a reflector, D, and below the horizon-sight is a similar reflector, E. These reflectors D E are arranged above and below the horizon-sight simply by preference, but should be in vertical line with the horizon-sight. On the turn-table upon the opposite side of its axis a sight-tube, F, is arranged in the usual manner for this class of instruments, but so that not only does the sight through the tube lead through the horizon-sight C, but also brings into range the two reflectors D E. Upon a vertical axis concentric with the axis of the circle a reflector, G, is hung, so as to turn upon the vertical axis the reflecting-surface toward the horizon-sight and reflectors D E. An arm, H, extends from the reflector outward onto the circle A, and is preferably made circumferentially adjustable by means of a screw, I, this screw being hung in the arm H and works through a nut, J, which is made adjustable on the circle, so that the arm H may be turned quickly to any desired position and then minute adjustment made by means of the screw I—a common adjustment in this class of instruments.

The reflector G stands in line with the reflector E. Above the reflector G, and hung upon the same axis, is a second reflector, K, also adapted to rotate about the same axis, and from it an arm, L, extends to the circle and adjustable thereon, as shown, the arm being adapted to be clamped to the circle by means of a set-screw, M. When properly adjusted, the reflector K stands in line with the reflector D.

By the adjustment of the two central reflectors, G and K they may be rotated about their axis to coact with the respective reflectors E D.

The instrument is provided with a concentric downwardly-extending handle, N, by which it may be conveniently taken in the hand.

If, now, holding the instrument in the hand and looking through the sight F, through the horizon-sight, one distant object be brought into that line and the instrument so held, then one of the reflectors, say G, be turned to reflect a second distant object at one side into the horizon-reflector E and in line with the object observed through the horizon-sight, and then the other reflector, K, turned to bring, say, a third object at the opposite side into the reflector D and in the same line with the horizon-sight and the object in the reflector E, then the angles on the circle observed will indicate the relation of the point where the observation is made to the said three objects. To illustrate: In Fig. 4 let $a$ represent the point from which the observation is to be taken; $b$, one distant object; $d$, a second distant object, say at the right of the object $b$, and a third distant object to the left, as at $e$. The point $a$ is the vertical axis of the instrument. The observer, looking through the horizon-sight, brings that sight into line with the object $b$. Then, still holding the horizon-sight in line with its object, the reflector G is turned until it receives the object $d$ and reflects it into its reflector at the horizon-sight and in line with the object $b$ of the horizon-sight. Now, holding the instrument with its two objects $b\ d$ in line at the horizon-sight, the other reflector, K, is in like manner turned to receive the object $e$ and throw it upon its reflector at the horizon-sight, and so as to bring the three objects into the same vertical line, and as indicated in broken lines. This observation having been taken, the graduations on the circle will show the angle of the several reflectors with relation to the horizon-sight. Suppose the horizon-sight to be in 0 line and the reflector G represents the point $d$ to be, say, sixty degrees from the horizon object, the reflector K represents the object $e$ to be, say, fifty degrees from the horizon object, thus the point $a$ is determined with relation to the three objects $b\ d\ e$, and this same point may be afterward ascertained by adjusting the reflectors to the known position and then through the sight bringing the instrument to a point where the three objects come into line at the horizon-sight; or, the relation of three distant objects known to each other, as the sun, moon, or fixed stars, observations through the instrument will indicate the angles which those luminaries bear to the position where the observation is taken, and by calculation that position may be determined. This illustration will be sufficient to enable a person skilled with the use of a reflecting-circle or like instrument to practically use my invention.

Additional reflectors hung upon the same concentric axis may be added to include a greater number of objects, if desirable; but in practice two concentrically-adjustable reflectors with the horizon-sight and the corresponding reflectors are all that are required for general use.

The mechanism for the adjustment of the various parts may be employed, such as used in like instruments, not necessary to be described. So, also, many known attachments for convenience of use may be applied without departing from the spirit of my invention, the essential feature of which is two or more reflectors adjustable upon the axis of a graduated circle with a horizon-sight and reflectors corresponding to the said two or more adjustable reflectors, whereby distant objects may, through the said reflectors, be brought into line with the horizon-sight.

I claim—

1. The combination of a graduated reflecting-circle, a horizon-sight perpendicular to the plane of the circle, and two or more reflectors hung upon axes in line with and corresponding to the axis of the circle, each of said reflectors being independently adjustable around its own axis, with reflectors corresponding to the said concentrically-hung reflectors and in line with the horizon-sight.

2. The combination of the graduated circle, a turn-table arranged on said circle and adapted to rotate about the axis of the said circle, a horizon-sight fixed on said turn-table, two or more reflectors arranged one above the other, both upon an axis concentric with said circle, each adjustable on its axis independent of the other, and reflectors corresponding to the said two or more concentric reflectors and fixed in line with said horizon-sight, substantially as described.

CHAS. H. TOWNSEND.

Witnesses:
JOHN E. EARLE,
FRED C. EARLE.